United States Patent [19]
Hueppauff et al.

[11] Patent Number: 5,767,622
[45] Date of Patent: Jun. 16, 1998

[54] ELECTROLUMINESCENT SYSTEM

[75] Inventors: Martin Hueppauff, Stuttgart; Dieter Fenske, Ettlingen; Guenter Schmid, Velbert, all of Germany

[73] Assignee: Robert Bosch GmbH, Stuttgart, Germany

[21] Appl. No.: 693,335

[22] PCT Filed: Dec. 19, 1995

[86] PCT No.: PCT/DE95/01821

§ 371 Date: Aug. 15, 1996

§ 102(e) Date: Aug. 15, 1996

[87] PCT Pub. No.: WO96/23044

PCT Pub. Date: Aug. 1, 1996

[30] Foreign Application Priority Data

Jan. 27, 1995 [DE] Germany ............... 195 02 541.5

[51] Int. Cl.$^6$ ............... B32B 33/00; C09K 11/70; H01J 61/44
[52] U.S. Cl. ............... 313/503; 313/502; 313/506; 428/917; 428/690
[58] Field of Search ............... 313/503, 504, 313/502, 506; 428/690, 917; 315/169.3

[56] References Cited

U.S. PATENT DOCUMENTS

| | | | |
|---|---|---|---|
| 4,902,929 | 2/1990 | Toyoda et al. | 313/503 |
| 5,220,243 | 6/1993 | Klinedinst et al. | 313/503 X |
| 5,300,858 | 4/1994 | Nikaido | 313/503 |
| 5,309,071 | 5/1994 | Karam et al. | 313/503 X |
| 5,593,782 | 1/1997 | Budd | 313/503 X |

FOREIGN PATENT DOCUMENTS 0079391  3/1990  Japan.

OTHER PUBLICATIONS

Colvin et al; Light emitting diodes made from cadmium selenide nanocrystalsand a semiconducting polymer, Aug. 1994.

*Primary Examiner*—Ashok Patel
*Attorney, Agent, or Firm*—Spencer & Frank

[57] ABSTRACT

An electroluminescent system, includes a light emitting substance which emits light when an electric voltage is applied thereto and which contains (a) inorganic particles which are clustered to provide inorganic clusters; and (b) organic ligand envelopes which are composed of an organic ligand material and which each envelope an inorganic cluster whereby the inorganic clusters are stabilized. The light emitting substance may additionally contain organic molecule chains which connect organic ligand envelopes to one another. Thus, the inorganic clusters are spaced apart by a spacing which may be preselected by providing organic molecule chains having a preselected number of atoms in the organic molecule chains.

17 Claims, 2 Drawing Sheets

ELECTROLUMINESCENT SYSTEM

BACKGROUND OF THE INVENTION

1. Field of the Invention

The invention relates to an electroluminescent system having a substance which is light-emitting when an electric voltage is applied.

2. Description of the Related Art

Electroluminescent systems are known. In these, either inorganic or organic substances are used which can be excited by means of an electrical voltage to send out light beams. As inorganic substances, for example, monocrystalline III–V or II–IV semiconductors and powdered ZnS compounds are used which may be doped differently. The drawback in these electroluminescent, inorganic systems is that high alternating voltages must be available as operating voltage. If these electroluminescent, inorganic systems are intended to be used, for example, in motor vehicles for the lighting of display instruments, the battery charge which is present in the motor vehicle as direct voltage must be converted accordingly. On the one hand, this voltage conversion is very complex and, because of the operation at high alternating voltages, it also requires an additional electromagnetic compatibility protection for further electronic systems of the motor vehicle.

Furthermore it is known to use electroluminescent, organic substances, for example, polymers, dyes, polymers doped with molecules and polymer blends. Here, it is a drawback, however, that the organic substances have an insufficient long-time stability, particularly a thermal and/or chemical stability. This means that the use of electroluminescent systems with organic substances is not possible in practical applications, for example, for the lighting of display instruments in motor vehicles.

SUMMARY OF THE INVENTION

In contrast, the electroluminescent system having a substance which is light-emitting when an electric voltage is applied, characterized in that the light-emitting substance (12) is formed by inorganic particles (22) which are connected with one another via organic spacers (26), offers an advantage that an electroluminescent system, which can be produced in a cost-advantageous manner and which is versatile in its applications, can be accomplished in a simple manner. Since the light-emitting substance is formed by inorganic particles, which are connected with one another via organic spacers, it is possible in an advantageous manner to obtain a light-emitting substance wherein the desired electrical, electronic, chemical, and mechanical properties can be achieved in a purposeful way. By means of the inorganic particles, which are connected with one another via the organic spacers, a binary system is created wherein the inorganic particles take over the electron conductivity of the light-emitting substance, while the organic spacers take over the mechanical stabilization of the light-emitting substance and the generation of the light radiation. Therewith, the properties of the inorganic particles are ideally combined with those of the organic spacers so that, by way of optimizing the inorganic particles as well as the organic spacers to fit their specific application, light-emitting substances can be accomplished that have a high thermal and/or chemical stability and that are provided with high quantum efficiency during electroluminescence. By means of a targeted installation of functional groups in the organic spacers it is possible to purposefully influence the probability for a radiant recombination of electrons and holes so that a high luminous efficiency can be accomplished with the light-emitting substance according to the invention.

An advantageous embodiment of the invention provides that the organic spacers are formed by an organic, e.g., sphere preferably an organic ligand, e.g., sphere. The organic ligand envelope determines the positioning of the inorganic particles within the light-emitting substance because the ligand envelopes enter into a chemical combination with one another which determines the mechanical stability of the substance and thus the position of the inorganic particles. By selecting a thickness for the ligand envelope with which the inorganic particles are surrounded, the spacing of the inorganic particles with respect to one another can be set. By selecting the spacing between the inorganic particles, a so-called tunneling of electrons can be set by way of the ligand envelope. Preferably, the thickness of the ligand envelope is selected such that the electron conduction through the light-emitting substance is ensured by means of the inorganic particles, with the electrons tunnelling through the ligand envelope. The ligand envelope made of organic substances has a high mobility for holes so that these can move within the ligand envelope. This resulting tunnel conductivity ensures the current flow through the inorganic particles, even though these are spaced apart with respect to one another due to the organic sheath that surrounds them.

A further advantageous embodiment of the invention provides that the organic ligand envelopes around the inorganic particles are connected with one another by means of organic molecule chains. This results in a cross linkage of the inorganic particles within the light-emitting substance, with it being possible to set the spacing between the inorganic particles by a number of atoms of the respective molecule chains. In this manner, the tunnel conductivity between the inorganic particles can be set in a very advantageous manner by way of the number of atoms within the molecule chains, that is, whether the distance between two adjacent inorganic particles is larger or smaller.

Further advantageous embodiments of the invention ensue from the remaining features which are cited in the dependent claims.

BRIEF DESCRIPTION OF THE DRAWINGS

In the following, the invention is explained in greater detail in embodiments by way of the associated drawings. These show.

DESCRIPTION OF THE PREFERRED EMBODIMENTS

Figure 1:
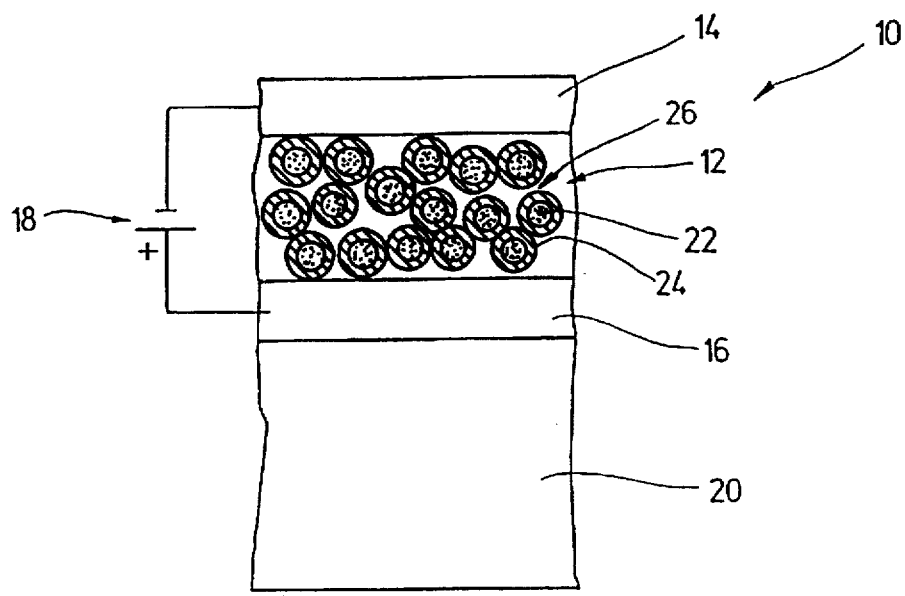
FIG. 1 a schematic sectional representation through an electroluminescent system in a first embodiment variant.

FIG. 1 illustrates an electroluminescent system which is generally identified by 10. The illustration schematically shows a detail of a section through a system 10. The system 10 has a light-emitting substance 12 which is arranged between a first electrode 14 and a second electrode 16. The electrodes 14 and 16 are embodied to be planar so that the light-emitting substances 12 disposed between the electrodes 14 and 16 are also embodied to be planar between the electrodes 14 and 16. The electrodes 14 and 16 are connected to a voltage source 18 which may be, for example, the battery of a motor vehicle. Here, a first electrode 14 is connected to ground and a second electrode 16 to the positive pole. The layer structure formed by the electrodes 14 and 16 and the substance 12 is arranged on a carrier 20.

The light-emitting substance 12 is comprised of inorganic particles 22, each being surrounded by an organic ligand envelope (sphere) 24. By way of the considerably simplified illustration it becomes clear that each of the inorganic particles is provided with a ligand envelope 24. Therewith it is ensured that the inorganic particles 22 cannot contact one another directly. The ligand envelopes 24 thus form a spacer 26 between the inorganic particles 22. Depending on the thickness of the ligand envelopes 24, the spacing between two adjacent inorganic particles 22 has a larger or smaller size. Usually, the ligand envelopes 24 are organic compounds with a thickness of a few atomic positions.

The inorganic particles 22 may be formed, for example, by electrically conductive clusters. The clusters may be semiconductor clusters i.e., clusters containing atoms of semiconducting materials, (for example, CdTe, CdSe, . . . ) or metal clusters i.e., clusters containing metal atoms, (for example, gold, palladium, platinum, nickel, . . . ). The clusters or the inorganic particles are present in a grain size in the nano range. The organic ligand envelope 24 may, for example, be comprised of organic compounds with extensive $\pi$-systems. The individual ligand envelopes 24 around the individual inorganic particles 22 enter into a chemical combination with one another, for example, by way of polymerization. Because of the small grain size of the inorganic particles in the nano range, the light-emitting substance 12 has a high degree of filling (packing density) so that a plurality of chemical compounds exists within the substances 12 between the individual ligand envelopes 24. This offers a great mechanical stability of the light-emitting substances 12. The inorganic particles 22 are thus stabilized by means of the ligand envelopes 24 within the substance 12.

The first electrode 14 is comprised of a material with low electron work function. The electrode 14 may be comprised of a metal, for example, aluminum, or a metal alloy whose electron work function is smaller than 4.5 eV. The second electrode 16 is comprised of a material with high electron work function. The electrode 16 may, for example, be comprised of an optically transparent material with good electrical conductivity, for example, indium tin oxide ITO, having an electron work function of larger than 4.5 eV.

The carrier 20 is comprised of an optically transparent substrate. Like the electrodes 14 and 16 as well as the substrate 12, the carrier 20 is embodied so as to be planar and is flexible.

The system 10 illustrated in FIG. 1 has the following function:

After the voltage source 18 has been connected with the electrodes 14 and 16, for example, by means of a circuit element, not shown, a current flows between the electrodes 14 and 16 across the light-emitting substance 12. The electrical conductivity of the light-emitting substance 12 results from the high electron conductivity of the inorganic particles 22. The ligand envelopes 24 around the individual inorganic particles 22 form a potential barrier which has a so-called tunnel conductivity. The conductivity of electrons or holes between the adjacent inorganic particles 22 is identified as tunnel conductivity. The tunnel conductivity is determined considerably by the spacing of the inorganic particles 22 which is predetermined by the thickness of the ligand envelope 24. By connecting the positive pole of the voltage source 18, the second electrode 16 acts as hole-injecting electrode for the light-emitting substance 12, while the ground-connected electrode 14 is connected as electron-injecting electrode. Since the organic ligand envelope 24 has a high mobility for holes, the tunneling of the electrodes is made possible by the ligand envelopes 24 so that, as a whole, an electron conductivity of the light-emitting substance 12 is provided.

The organic ligand envelopes 24 have functional groups which do not have to be considered here in detail and which, on the one hand, form traps for the polymerization of the individual ligand envelopes 24 among one another and, on the other hand, form recombination centers for so-called exit ions. In this manner, a radiating recombination within the recombination centers takes place during the electron conduction through the light-emitting substance 12 so that the light-emitting substance 12 can radiate light. This radiating recombination within the light-emitting substance 12 can be radiated toward the outside by means of the optically transparent electrode 16 and the optically transparent carrier 20 so that the electroluminescent system 10 shown in FIG. 1 can serve as a luminous source.

The composition of the light-emitting substance 12 mentioned in the embodiment is merely exemplary. As a whole, the material selection of the inorganic particles 12 and of the organic ligand envelope 24 must be tailored such that a high electron conductivity is provided in the inorganic particles 22 and a high hole conductivity in the ligand envelope 24. On the other hand, a high hole conductivity may also be present within the inorganic particles 22 and a high electron conductivity in the organic ligand envelope 24. The organic ligand envelope 24 possesses a high probability for a radiating recombination of electrons and holes so that this results in a high quantum efficiency during electron luminescence of the entire system 10. Furthermore, a mechanical, thermal and chemical stability of the light-emitting substance 12 is accomplished by way of the functional division among the inorganic particles 22 and the ligand envelopes 24. The two-way influencing of the inorganic particles 22 and of the ligand envelopes 24 has the effect that the electron conduction of the light-emitting substance 12 is carried by the inorganic particles 22, while the organic ligand envelopes are only in an excited state immediately prior to the recombination. This results in a considerably increased long-time stability of the organic ligand envelopes 24 so that a thermal and chemical stability (particularly oxidation) is provided for a long time period.

The system 10 illustrated in FIG. 1 is therefore eminently suited as a luminous source. Owing to the planar production of the system 10, any desired luminous source may, in principle, be formed from the system 10 by means of mechanical working methods, for example, stamping, cutting, etc.. By way of the selection of the organic compounds in the ligand envelopes, the color spectrum of the light-emitting substance 12 can be set.

Figure 2:
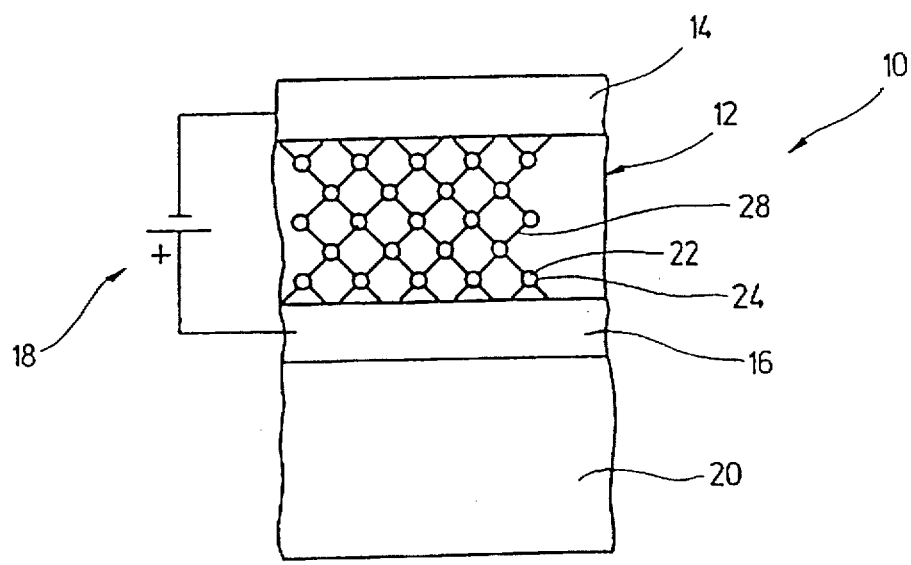
FIG. 2 a schematic sectional representation through an electroluminescent system in a second embodiment variant, and FIG. 3 examples of organic molecule chains that are used.
Figure 3:
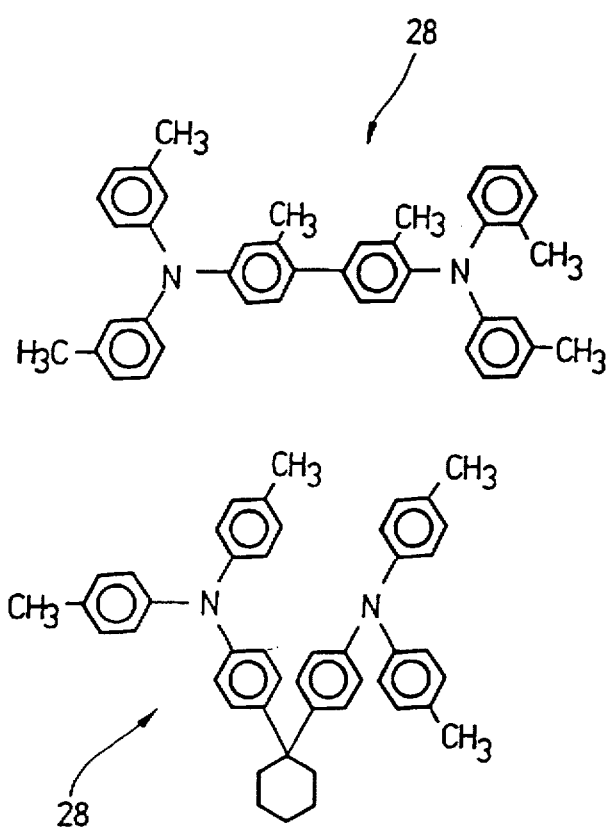

FIG. 2 illustrates a further embodiment variant of an electroluminescent system 10. Elements that are identical to those in FIG. 1 are provided with identical reference numerals and are not explained again. In addition to the arrangement of the inorganic particles 22 and the ligand envelope 24 within the light-emitting substance 12 illustrated in FIG. 1, molecule chains 28 are arranged here between the ligand envelopes 24. The molecule chains 28 between the individual ligand envelopes 24 thus form a cross linkage for the inorganic particles 22 within the light-emitting substance 12. As shown in greater detail in FIG. 3, the molecule chains 28 may be, for example, aromatic diamines (upper illustration)

or triphenylaminedimers (lower illustration). Here, the molecule chains 28 may have independent functional substituents. A length of the molecule chains 28 can be set by a number of the atoms comprised in each of the molecule chains 28. Thus, the spacing of the inorganic particles 22 with respect to one another can be set via the number of the atoms within the molecule chains 28. The tunnel conductivity between the inorganic particles 22 can be influenced by way of the variability of the spacing between the inorganic particles 22 in that the tunnel probability of the electrons can be influenced by the ligand envelope 24. As a whole, the light-emitting substance 12 can thus be optimized to provide a light efficiency which is as high as possible.

By way of the embodiments it becomes clear that it is possible in a simple manner to create large-surface, electroluminescent systems 10 in a cost-advantageous manner which, apart from a high light efficiency, have a high stability from a mechanical, thermal as well as a chemical viewpoint.

What is claimed is:

1. An electroluminescent system, comprising:
   a light emitting substance which emits light when an electric voltage is applied thereto and which comprises:
   inorganic particles which are clustered to provide inorganic clusters; and
   organic ligand envelopes which are comprised of an organic ligand material and which each envelope an inorganic cluster whereby the inorganic clusters are stabilized.

2. The electroluminescent system according to claim 1, wherein the inorganic clusters are one of clusters containing atoms of semiconducting materials or clusters containing metal atoms.

3. The electroluminescent system according to claim 1, wherein the organic ligand envelope comprises functional groups for which electroluminescence is produced by a radiant recombination of holes and electrons.

4. The electroluminescent system according to claim 1, wherein the organic ligand envelopes are comprised of organic compounds having an extensive π-system.

5. The electroluminescent system according to claim 4, wherein the organic compounds chemically combine with one another by polymerization.

6. The electroluminescent system according to claim 1, wherein the light emitting substance further comprises organic molecule chains which connect organic ligand envelopes to one another.

7. The electroluminescent system according to claim 6, wherein the organic molecule chains comprise functional, independent substituents.

8. The electroluminescent system according to claim 7, wherein the inorganic clusters are spaced apart by a spacing which may be preselected by providing organic molecule chains having a preselected number of atoms in the organic molecule chains.

9. The electroluminescent system according to claim 1, further comprising first and second electrodes between which the light-emitting substance is arranged so as to be substantially planar and so as to collectively form a layer system.

10. The electroluminescent system according to claim 9, wherein the first electrode is comprised of a material having an electron work function which is low and is less than 4.5 Ev.

11. The electroluminescent system according to claim 10, wherein the second electrode is comprised of a material having an electron work function which is high and is greater than 4.5 Ev.

12. The electroluminescent system according to claim 11, wherein at least one of the first and the second electrodes is comprised of an optically transparent material.

13. The electroluminescent system according to claim 11, further comprising a carrier on which the layer system comprised of the first and second electrodes and the light-emitting substance is arranged.

14. The electroluminescent system according to claim 13, wherein the carrier is comprised of an optically transparent material.

15. The electroluminescent system according to claim 14, wherein the carrier is flexible.

16. The electroluminescent system according to claim 1, wherein inorganic clusters and the organic ligand envelopes form inorganic cluster compounds.

17. The electroluminescent system according to claim 1, wherein the light emitting substance further comprises organic spacer molecules which connect the organic ligand envelopes to one another.

* * * * *